(No Model.)
P. MUSSELMAN.
APPARATUS FOR BOILING MEATS.
No. 560,596. Patented May 19, 1896.
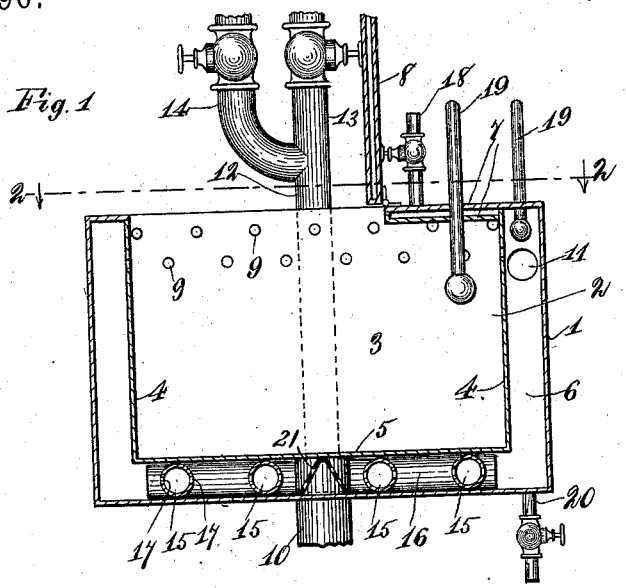
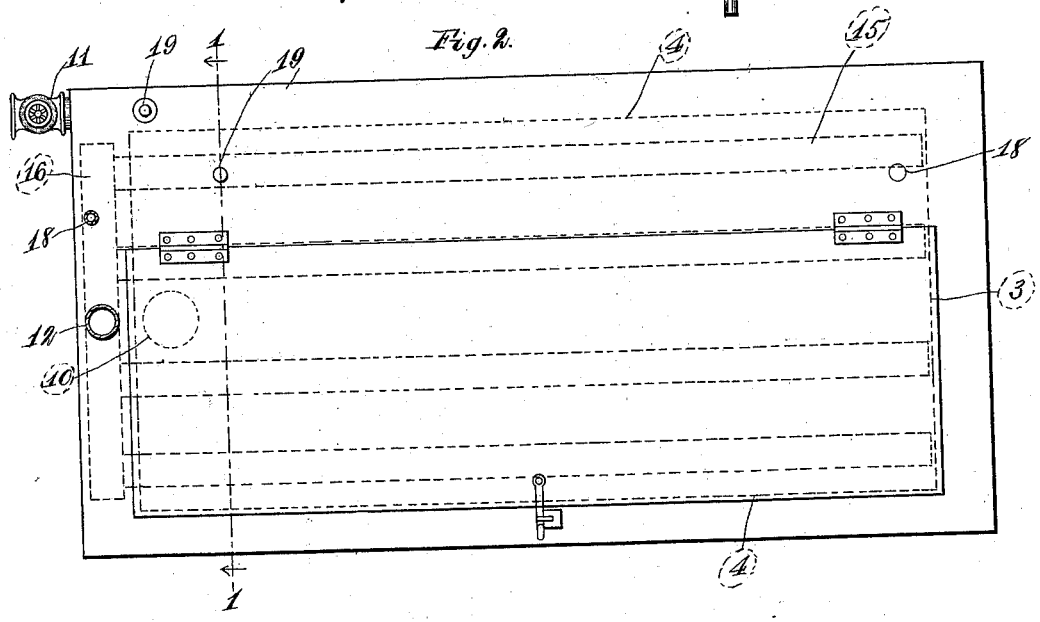
Witnesses:
Rudolph W. Lotz
E. J. Boileau
Inventor:
Peter Musselman
By Harry Cobb Kennedy.
Attorney.

UNITED STATES PATENT OFFICE.

PETER MUSSELMAN, OF CHICAGO, ILLINOIS, ASSIGNOR OF THREE-FOURTHS TO LOUIS ROSENZWEIG AND BERNHARDT J. FRANK, OF SAME PLACE.

APPARATUS FOR BOILING MEATS.

SPECIFICATION forming part of Letters Patent No. 560,596, dated May 19, 1896.

Application filed January 26, 1895. Serial No. 536,354. (No model.)

*To all whom it may concern:*

Be it known that I, PETER MUSSELMAN, a citizen of the United States, residing at Chicago, in the county of Cook and State of Illinois, have invented certain new and useful Improvements in Apparatus for Boiling Meats; and I do hereby declare the following to be a full, clear, and exact description of the invention, such as will enable others skilled in the art to which it appertains to make and use the same.

This invention relates to a novel apparatus for boiling meats, and is adapted more especially for cooking hams and the like in the process of preparing ham for the market.

The invention consists in the features of construction hereinafter described and specifically claimed.

In the accompanying drawings, illustrating my invention, Figure 1 is a cross-section of my improved apparatus, taken on the line 1 1 of Fig. 2. Fig. 2 is a top plan view, partly in section, on the line 2 2 of Fig. 1.

In accordance with my invention I first cook the meat to the desired extent and then quickly cool the same, which latter step is accomplished by the application of some cooling medium that will quickly and efficiently reduce the temperature of the cooked meat to close the pores of the same, and thereby retain the juices to produce a higher grade and more nutritious article by retaining the juices that would otherwise slowly exude should the meat be gradually allowed to cool off and the pores slowly close.

Referring now to the accompanying drawings, the device consists of an outer casing 1 and an inner casing 2. The said inner casing 2 is provided with the end walls 3, side walls 4, and bottom 5, and is smaller than the outer casing, so as to provide a jacket 6, formed between the walls of the inner and outer casings. This jacket does not extend across the top of the device; but the inner casing is provided with double walls 7 on top, and also a door 8, hinged thereto and provided with double walls. The side and end walls 3 and 4 of the inner casing 2 are provided with openings 9 near their upper ends to establish communication between the jacket 6 and the inner casing, and the said inner casing is provided at its bottom and near one end thereof with an outlet-port 10 for the egress of juices that exude during the cooking operation and condensed vapor from the steam, and this port 10 can be controlled by any suitable trap to create a pressure within the inner casing or to prevent the rapid egress of the steam therefrom. The jacket 6 is provided with a valved outlet-port 11, which is located a little below the openings 9 of the inner casing.

An inlet pipe or passage 12 to conduct into the heater the medium for carrying on the process communicates at its outer end with the valved branches 13 and 14, leading, respectively, to sources supplying steam or cold water thereto, while at its other end said pipe 12 communicates with distributing-pipes 15 through a cross-pipe 16, located within and at one end of the jacket, and which distributing-pipes 15 are located longitudinally beneath the inner casing 2. These pipes 15 have lateral projections 17 to permit the entrance of the steam or cold water into the jacket.

The jacket and the inner casing are each provided with a blow-off 18 and thermometers 19 to most efficiently conduct the process. Resting upon the bottom of the outer casing and about midway between the sides thereof is a longitudinally-extending brace 21, upon the upper edge of which the inner casing 2 rests, and which serves to support said inner casing. This brace 21 is perforated to permit the free circulation of the steam or cold water admitted through the distributing-pipes 15.

In using this apparatus above described I first place the meats within the inner casing 2 and close the door 8. Steam is then admitted to the jacket 6 through the distributing-pipes, it being noted, of course, that the branch 14 and outlet-port 11 are closed. The steam entering the jacket passes into the inner casing through the openings 9, and after the meat has been sufficiently cooked the steam-supply is cut off and the water-supply through branch 14 is open while the outlet 11 is open. The cold water passes into the jacket and rises therein until it reaches the outlet-port 11, through which it passes off, and by reason of its cooling effect the meats will be quickly cooled, as before described. The outer casing is preferably provided with a drain-pipe 20 for withdrawing the condensation from the steam and for withdrawing the water from the jacket.

I claim as my invention—

In a device of the kind specified a casing provided with a jacket communicating therewith through openings in the upper portion thereof, distributing-pipes situated within and communicating therewith, a source of supply-steam for said distributing-pipes, a source of supply of water for said distributing-pipes, an outlet for said casing in the bottom thereof, an outlet for said jacket situated adjacent the bottom thereof, and an overflow for said jacket situated below the openings in said casing to prevent the entrance of water into said casing, substantially as described.

In testimony whereof I affix my signature in presence of two witnesses.

PETER MUSSELMAN.

Witnesses:
RUDOLPH WM. LOTZ,
BERNHARDT J. FRANK.